United States Patent [19]

Gleason

[11] Patent Number: 4,947,530
[45] Date of Patent: Aug. 14, 1990

[54] METHOD AND APPARATUS FOR REPAIRING PALLETS

[76] Inventor: Terry L. Gleason, 4035 N. Hydraulic, Wichita, Kans. 67219

[21] Appl. No.: 348,770

[22] Filed: May 8, 1989

Related U.S. Application Data

[62] Division of Ser. No. 194,138, May 16, 1988, Pat. No. 4,845,825.

[51] Int. Cl.$^5$ .............................................. B23P 7/00
[52] U.S. Cl. ..................................... 29/402.14; 29/252
[58] Field of Search ............................ 29/252, 402.14; 227/130, 152, 153, 154, 155

[56] References Cited

U.S. PATENT DOCUMENTS

| | | | |
|---|---|---|---|
| 3,823,861 | 7/1974 | Jureit et al. | 227/153 |
| 4,595,333 | 6/1986 | Ono et al. | 901/31 X |

FOREIGN PATENT DOCUMENTS

| | | | |
|---|---|---|---|
| 2510933 | 2/1983 | France | 29/709 |
| 585965 | 1/1978 | U.S.S.R. | 901/40 |
| 727425 | 4/1980 | U.S.S.R. | 901/40 |

Primary Examiner—Timothy V. Eley
Attorney, Agent, or Firm—Kokjer, Kircher, Bradley, Wharton, Bowman & Johnson

[57] ABSTRACT

Apparatus for repairing broken stringers of wooden pallets and a method involving the use of the apparatus is disclosed. The apparatus comprises a pair of interconnected jaws having pads mounted on one end with magnets to secure studded repair plates to the pads. A broken stringer is inserted between the pads and the jaws are swung together to imbed the studs in the wood with the plate extending across the break effecting the repair. The pads are provided with limiting pivoting movement to insure proper alignment of the plates with respect to the stringer sides irrespective of the angle of the jaws when the studs contact the wood. A jack is used to adjust the vertical positions of the jaws for convenient use of the apparatus.

7 Claims, 2 Drawing Sheets

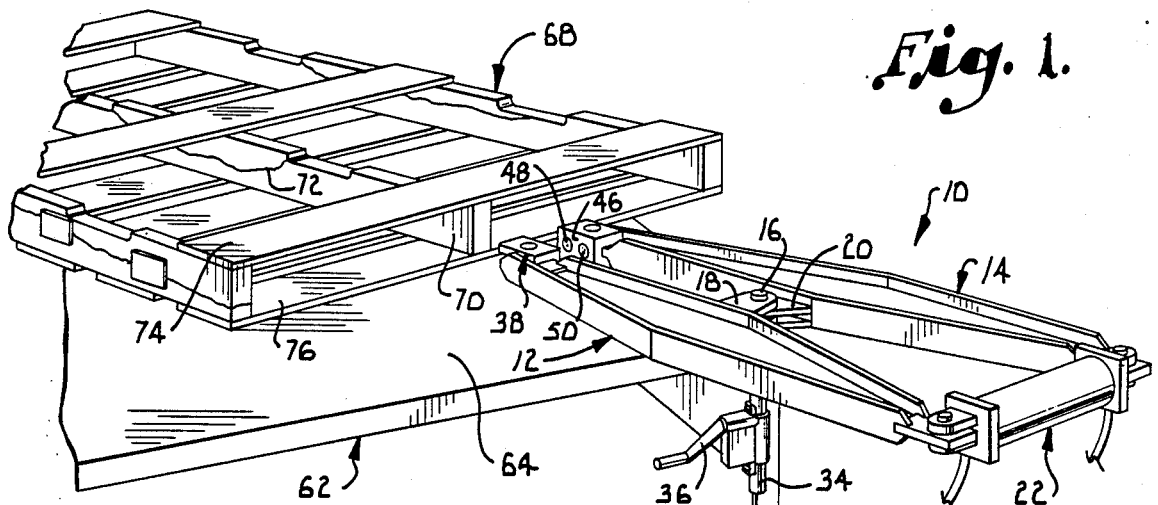

4,947,530

METHOD AND APPARATUS FOR REPAIRING PALLETS

This is a division of application Ser. No. 194,138, filed May 16, 1988 now U.S. Pat. No. 4,845,825.

BACKGROUND AND SUMMARY OF THE INVENTION

This invention pertains to the repair of pallets, and more particularly to an apparatus and a method for restoring broken pallets of the type used for handling, storage or movement of materials and cartons in warehouses, factories or vehicles. Pallets of this type characteristically comprise a number of elongated, relatively substantial, spaced apart frame boards or stringers interconnected by a plurality of cross boards or slats which provide the top and bottom surfaces of the pallet. The slats are usually secured to the stringers by nailing. The stringers are the principal load bearing members of the pallet and, as a consequence, the stringers are subject to breaking when the loads and pallets are moved by fork lifts during routine freight handling operations. Typically, relatively inexpensive, uncured lumber is used for pallet construction and such lumber is often also susceptible to cracking while aging.

Pallets of this type are used in large quantities commercially and the cost of replacing broken pallets can be substantial. Considerable labor is involved in the removal and replacement of a broken stringer in a pallet. As a consequence, the entire pallet has heretofore usually been discarded and replaced with a new pallet when one or more of the stringers breaks. Considerable savings in the cost of handling palletized materials would result if the expense of replacing broken pallets could be substantially reduced or eliminated entirely. The resulting savings could be passed on to the ultimate consumer in the form of lesser freight and handling charges.

Accordingly, it is a principal object of the present invention to provide an apparatus and a method for use of the apparatus which can readily repair broken pallet stringers without the necessity for disassembling the pallet, thereby avoiding the labor intensive, expensive reconstruction of such pallets.

It is also a very important object of the present invention to provide such an apparatus and method which effects reliable repairs rendering a broken pallet sufficiently strong that it may be safely returned to service.

A further object of this invention is to provide a method and apparatus wherein a relatively few workmen can effectively repair a high volume of pallets to reduce the per unit cost for such repairs.

Another object of the present invention is to provide an apparatus which is highly versatile and capable of repairing various pallets of differing dimensions without the necessity for substantial machine adjustments.

These and other important aims and objectives of the present invention will be further explained or will become apparent from the description, the drawings and the claims.

DESCRIPTION OF THE DRAWINGS

In the accompanying drawings which form a part of the specification and are to be read in conjunction therewith and in which like reference numerals are used to indicate like parts in the various views:

FIG. 1 is a fragmentary, partially exploded perspective view on a reduced scale of a typical installation of equipment embodying this invention and a broken pallet awaiting repair;

FIG. 2 is an enlarged, perspective view of a plate of the type used in this invention for repairing stringers, only a portion of the plate teeth being shown in detail, the remainder of the teeth being indicated by broken lines;

FIG. 6 is a fragmentary, enlarged elevational view taken along line 6—6 of FIG. 3, parts being broken away to reveal details of construction.

DETAILED DESCRIPTION OF THE INVENTION

Figure 3:
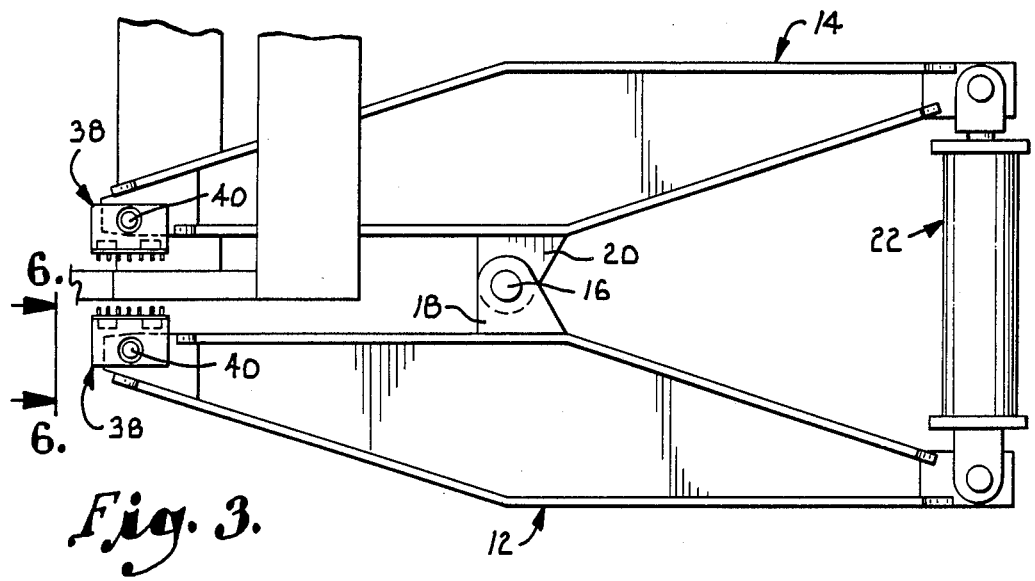
FIG. 3 is a top plan view of the jaws of apparatus embodying the principles of this invention shown in position for applying plates to a broken pallet stringer, the pallet being shown fragmentally, certain parts of the apparatus being shown in phantom to reveal details of construction.

Apparatus embodying the principles of this invention is broadly designated in the drawings by the reference numeral 10 and includes a pair of jaws 12 and 14 which may be substantially mirror images of one another. Jaws 12 and 14 are pivotally interconnected intermediate their ends by a pin 16 extending through aligned holes in brackets 18 and 20 integrally secured to and projecting from their corresponding jaws 12 and 14, respectively. One end of each jaw is interconnected to the other jaw by power means for swinging the jaw about the generally vertical axis defined by pin 16. Power means 22 is operably connected to a fluid operating unit 24 comprising a pump 26 and a reservoir 28 operable by a control 30 as will be more fully explained hereinafter.

Figure 4:
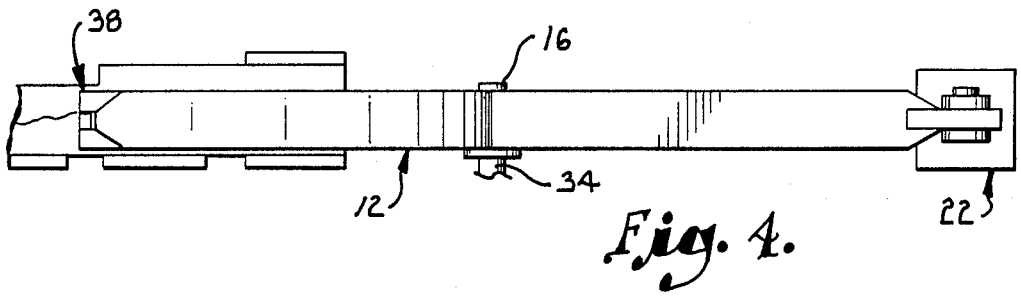
FIG. 4 is a side elevational view of the jaws of FIG. 3.
Figure 5:
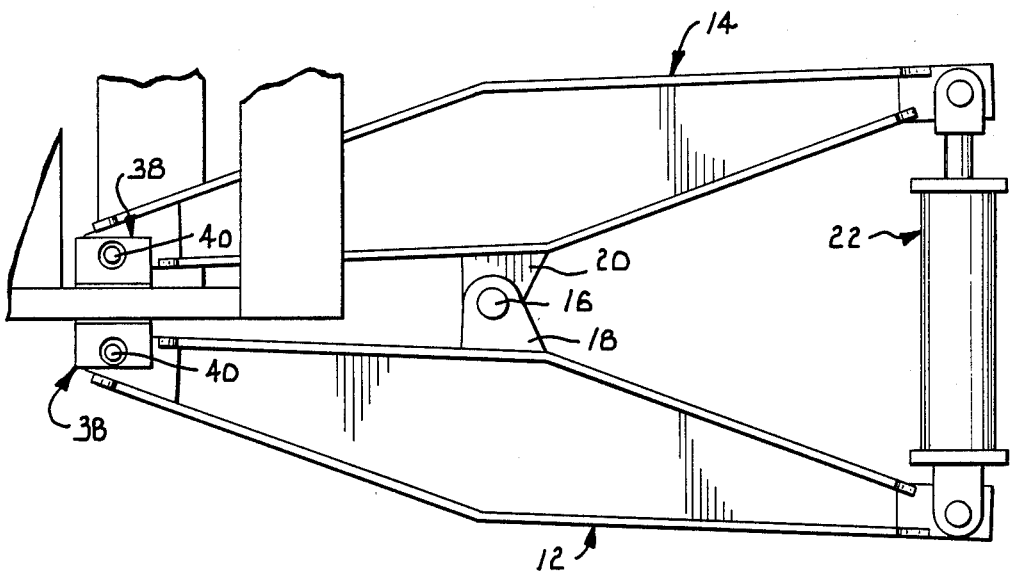
FIG. 5 is a view similar to FIG. 3, but showing the jaws in their respective positions after the plates have been installed.

The jaws 12 and 14 are supported in spaced relationship above the ground or other suitable supporting surface by a jack 32 having a movable shaft 34 operably associated with the respective jaws for supporting the weight thereof while permitting the jaws to freely turn with respect to the shaft 34 as is shown in FIG. 4. Manifestly, the vertical height of the jaws can be adjusted by manual operation of crank 36.

Referring more specifically to FIGS. 3 and 6 of the drawing, the ends of the respective jaws 12 and 14 are each provided with a relatively massive pad 38 mounted to its respective jaw for limited pivoting movement with respect thereto by a pin 40 extending through a bore 42 in the pad and a hole 44 in the jaw as shown best in FIG. 6. Each pad 38 has a substantially flat surface 46 disposed in generally facing, opposed relationship to the corresponding flat surface of the other pad. A pair of magnets 48 and 50 are positioned in recesses 52 provided in the pads 38 so that the outer surfaces 54 of the respective magnets lie in general parallelism with the flat surface 46 of the corresponding pad as shown in FIG. 6.

A plate of the type which may be utilized in the use of apparatus 10 for repairing pallets pursuant to the principles of this invention is broadly designated by the reference numeral 56 in FIG. 2 of the drawing. Plate 56 is of conventional construction and forms no part per se of this invention. Plate 56 comprises a substantially flat sheet 58 of magnetic material which is preferably steel because of its high strength characteristics. Sheet 58 is punched in a manner to provide a plurality of spaced apart, integral studs 60 uniformly over the entire surface of sheet 58 and projecting outwardly from the surface of the sheet. All of the studs 60 are preferably of a uniform length and all studs project from the sheet in the same direction as shown in FIGS. 2 and 6 of the drawing. The process by which the studs are formed from the sheet preferably leaves the outer projecting ends of the studs sharpened to enhance the insertion of the studs into wood.

In operation, apparatus 10 is preferably installed at an operating location adjacent a pallet support in the nature of table 62. The vertical height of the respective jaws is readily adjustable by operation of jack 32 so that the jaws project in cantilevered fashion over the surface 64 of the table as shown in FIG. 1 of the drawing.

Power means 22 of operating unit 24 is preferably of the double acting type and the operating unit is constructed so that an operator may hold control 30 in his hand or the unit may be disposed in close proximity to the operator to permit the latter to push button 66 with his foot to actuate the unit. Pushing of the button operates cylinder 22 to swing jaws 12 and 14 about pin 16 to bring the flat surfaces 46 of the pads toward one another. Release of the button operates unit 22 to swing the jaws in the opposite direction to move surfaces 46 away from one another.

Operating unit 24 and its control 30 are standard commercially available items utilized for a variety of purposes and form no part of the instant invention per se. Accordingly, the construction of unit 24 and control 30 need not be described in detail. A unit which has been found suitable for operation in accordance with the principles of this invention is manufactured and sold by Rexroth Worldwide Hydraulics, Bethlehem, Pa., as its standard hydraulic power unit model RA 51021. Other comparable operating units may also be used.

Control 30 is operably coupled to unit 24 so that the jaws 12 and 14 are swung away from one another at any time button 66 is released. Conversely, when the button is pushed, the jaws swing the pads toward one another.

Once the vertical height of the jaws of unit 10 are satisfactorily adjusted, a pallet broadly designated by the number 68 is slid or otherwise maneuvered so that a stringer 70 having a break 72 can be inserted between pads 38 as will be readily apparent. It should be pointed out at this juncture that the vertical transverse dimension of the jaws and pads is sufficiently small to permit ready telescoping of the pallet over the jaws in the space afforded between the transversely extending boards 74 and 76 defining the upper and lower pallet surfaces. Prior to the telescoping of the pallet over the jaws, a plate 56 is releasably attached to each pad 38 with the flat back surface of the plate magnetically attached to the flat surface 46 of its corresponding pad. The pad surfaces 46 are preferably of the same size as the plates and the plates are attached to the pads with the studs 60 of the respective plates projecting toward the opposite pad as will be readily understood.

Applicant has found that a pair of spaced apart magnets for each respective pad, with the magnets positioned generally as shown in FIG. 1 of the drawing, are adequate for magnetically holding the pads in position. In the construction shown, magnets having approximately 13 pounds holding force each have been successfully utilized.

Once the pads with their corresponding plates are positioned intermediate the ends of the broken stringer to be repaired, so that the plates are in position to straddle the break, the operator pushes button 66 to cause the jaws to be swung to move the pads 38 toward one another. Sufficient force is imparted through the jaws by power means 22 to force the studs of the respective plates fully into the wood with some of the studs of each plate located on each side of the break so that the installed plate is capable of bearing whatever load may be imparted on the previously weakened stringer.

The overwhelming majority of breaks which occur during use and handling of pallets of this type occur in the primary load bearing stringers. Further, these breaks generally extend along the grain of the wood which is longitudinally of the stringers. Accordingly, the installation of a pair of plates on opposite side of the broken stringer straddling the break is more than adequate for returning the stringer to serviceable, load bearing condition.

Once a broken stringer has been mended, the pallet can be simply withdrawn from the position with the mended stringer extending between the pads. If only one stringer is broken for a particular pallet, the pallet is then in condition for return to service. On the other hand, if one or more other stringers of the pallet is also broken, the procedure is repeated to mend the other stringer or stringers.

Manifestly, if a break should be located in closer proximity to the opposite end of the pallet, it is a simple procedure for the pallet to be rotated so that the opposite end of the broken stringer can be moved between the pads for the installation of the repairing plates by apparatus 10.

Means other than magnets could, of course, be utilized for releasably attaching the plates 56 to their respective pads 38 for installation by apparatus 10. However, it has been found that the magnets are well suited for this purpose because the plates become secured to the wood after the studs are pressed into the wood so that the magnetic holding force between the plates and the corresponding magnets is easily broken when the jaws are swung open. This permits ready removal of the pallet after it is repaired without the necessity for further operating attention to disengage the plates from the apparatus.

The importance of the pivotal mounting of the pads 38 to their respective jaws for limited swinging movement about axes parallel with the axis of swinging of the jaws should not be overlooked. Proper placement of the respective plates with the studs fully inserted into the stringer wood is important. However, the widths of different stringers may vary. Further, pallets are not constructed with absolute precision and the wood used for such construction is often relatively inexpensive and may be uncured. Such wood is subject to warping, particularly under the conditions which may be encountered by the pallets. It is, therefore, not possible to calculate accurately the precise positional relationship which will exist between the sides of a stringer and the pads at the time the projecting ends of the studs engage the wood. If the plates are not substantially parallel to the wood when the force is applied by the jaws, the force imparted by the jaws could bend the projections or result in less than full insertion of the projections into the wood.

The pivotal coupling of the pads to their respective jaws for limited swinging movement allows the pads to align themselves with the surface of the wood as the studs engage the corresponding stringer side irrespective of the angles between the jaws at the moment of engagement. This insures that the clamping force exerted by the jaws is always exerted perpendicularly to the plane of the plate so that complete and accurate installation of the plate results at all times.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, I claim:

1. A method for repairing a wooden pallet stringer having a break in the stringer, said method comprising the steps of:
   releasably securing a plate having a plurality of studs projecting outwardly from one side thereof to an elongated, rigid member;
   moving the member longitudinally of the stringer to position said plate adjacent said break in the stringer with the plate studs directed toward the stringer;
   positioning a back-up element on the opposite side of said stringer from the plate;
   applying a clamping force between the member and the back-up element while simultaneously permitting the holding member and said plate to move into alignment with the stringer upon engagement of the plate with the stringer to press the studs of the plate into wood of the stringer, the plate extending across the break so that some studs enter the wood on one side of the break while other of said studs enter the wood on the opposite side of said break;
   releasing said clamping force;
   releasing the plate from said member; and
   removing the member and element from their respective positions relative to the stringer, the plate remaining secured by said studs repairing the break in the stringer.

2. A method as set forth in claim 1, wherein is included the step of releasably securing a second studded plate to said back-up element in disposition with the studs of said second plate projecting toward said stringer and opposite the plate secured to said member, whereby the studs of said second plate are forced into the stringer when said clamping force is applied between the member and the element.

3. A method as set forth in claim 1, wherein said plate is releasably secured to said member with a magnetic force.

4. A method for repairing an elongated wooden pallet stringer having a break in the stringer, said method comprising the steps of:
   releasably securing a plate having a plurality of studs projecting outwardly from one side thereof to a holding member;
   effecting relative movement between the members and the stringer longitudinally of the latter to position said plate adjacent said break in the stringer with the plate studs directed toward the stringer;
   positioning a back-up element on the opposite side of said stringer from the plate;
   applying a clamping force between the member and the back-up element while simultaneously permitting the holding member and said plate to move into alignment with the stringer upon engagement of the plate with the stringer to press the studs of the plate into the wood of the stringer, the plate extending across the break so that some studs enter the wood on one side of the break while other studs enter the wood on the opposite side of said break;
   releasing said clamping force;
   releasing the plate from said member; and
   removing the member and the element from their respective positions relative to the stringer, the plate remaining secured by said studs repairing the break in the stringer.

5. A method as set forth in claim 4, wherein said clamping force is applied by hydraulically operated means.

6. A method as set forth in claim 4, wherein said plate is releasably secured to said member with a magnetic force.

7. A method as set forth in claim 4, wherein is included the step of releasably securing a second studded plate to said back-up element in disposition with the studs of said second plate projecting toward said stringer and opposite the plate secured to said member, whereby the studs of said second plate are forced into the stringer when said clamping force is applied between the member and the element.

* * * * *